United States Patent [19]

Reed

[11] 4,240,601

[45] Dec. 23, 1980

[54] METHOD FOR OBSERVING THE FEATURES CHARACTERIZING THE SURFACE OF A LAND MASS

[75] Inventor: Robert D. Reed, Lancaster, Calif.

[73] Assignee: The United States of America as represented by the Administrator of the National Aeronautics and Space Administration, Washington, D.C.

[21] Appl. No.: 43,912

[22] Filed: May 30, 1979

[51] Int. Cl.³ .......................... B64G 1/62; B64G 9/00
[52] U.S. Cl. ...................................... 244/160; 244/49
[58] Field of Search ............. 244/49, 158, 160, 162, 244/138 R; 33/1 A; 358/108, 109

[56] References Cited

U.S. PATENT DOCUMENTS 2,763,447  9/1956  Carrau .......................... 244/160 X
3,744,741  7/1973  Christian ........................ 244/49 X

OTHER PUBLICATIONS

R. Dale Reed, "High Flying Mini-Sniffer RPV:Mars Bound?" *Aeronautics and Astronautics*, Jun. 1978, pp. 26–39.

*Primary Examiner*—Barry L. Kelmachter
*Attorney, Agent, or Firm*—Monte F. Mott; John R. Manning; Paul F. McCaul

[57] ABSTRACT

A method wherein a propeller driven, hydrazine powered aircraft is remotely piloted through rarefied atmosphere of a selected planet, including the planet Earth, and employed as a communication platform for a telemetry system provided for relaying information relating to features characterizing the surface of the planet.

4 Claims, 13 Drawing Figures

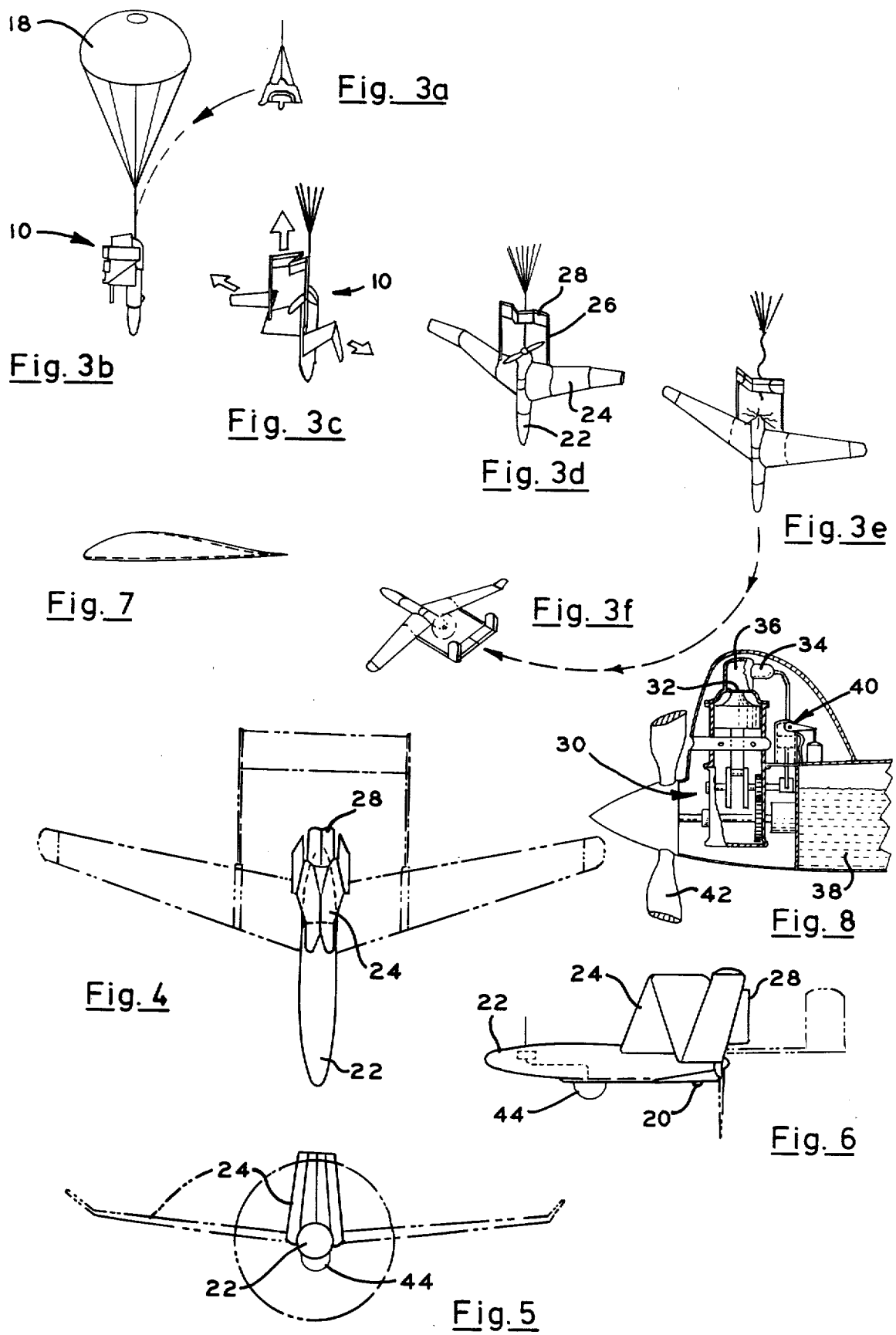

METHOD FOR OBSERVING THE FEATURES CHARACTERIZING THE SURFACE OF A LAND MASS

ORIGIN OF THE INVENTION

The invention described herein was made by employees of the United States Government and may be manufactured and used by or for the Government for Government purposes without the payment of any royalties thereon or therefor.

BACKGROUND OF THE INVENTION

1. Field of the Invention

The invention generally relates to a use of remotely piloted aircraft for gathering information, and more particularly to a method wherein a propeller driven, hydrazine powered aircraft is flown through the rarefied and/or oxygen free atmosphere of a planet, including the planet Earth, and employed as a communications platform for relaying data relating to features characterizing the surface of the planet's land mass.

2. Description of the Prior Art

For many years, it has been common practice to obtain data relating to the surface characteristics of remote land masses through a use of sensors, cameras, and detectors of various sorts. Customarily, the data is acquired utilizing high altitude probes as well as probes operating in fly-by or impact modes. The acquired data subsequently is electronically relayed to an earth station.

Of course, vehicles operating in high altitude and fly-by modes tend to fail to perform a "close" examination, while vehicles designed to impact the surface of the land mass fail to examine more than the vicinity of impact which necessarily comprises a relatively small area on the surface of the planet.

However, if precise and complete data, relating to the surface being examined, is to be collected, it is highly desirable, if not absolutely necessary, to employ a vehicle having a capability of transporting sensors, cameras, detectors and like equipment at low altitudes ranging from just above ground level to a few thousand feet in order to assure that desired close surveillance is achieved. Additionally, it is necessary that the vehicle employed be required to travel at relatively slow speeds, for accommodating detailed examination, and remain aloft for periods of relatively long durations sufficient to render such missions economically practicable. Often, the surface to be examined, such as high mountain ranges found on Earth, or the surface of the planet Mars, is characterized by wind turbulence and/or a rarefied atmosphere.

It is therefore the general purpose of the instant invention to provide a surveillance method for acquiring data relating to features characterizing remote surfaces of land masses, employing slow speed, propeller driven aircraft adapted to be launched into a rarefied atmosphere and remotely piloted above the surface thereof.

OBJECTS AND SUMMARY OF THE INVENTION

It is an object of the instant invention to provide an improved method of surveillance for closely observing features of land masses.

It is another object to provide in a method for observing features characterizing the surfaces of the planets including the planet Earth which includes the steps of piloting a slow-speed aircraft through the atmosphere thereof.

It is another object to provide in a method for observing features characterizing the surfaces of land masses for celestial bodies the steps including launching a propeller driven aircraft into the atmosphere thereof for purposes of acquiring and transmitting data to a communication link for ultimate transmission to a receiver located on the earth's surface.

These and other objects and advantages are achieved through the use of a method which includes the step of flying a remotely-piloted, propeller driven aircraft through the atmosphere of a selected celestial body, including that of the planet Earth for purposes of acquiring and transmitting data related to the features characterizing the surface of the body, as will hereinafter become more readily apparent by reference to the following description and claims in light of the accompanying drawings.

DESCRIPTION OF THE DRAWINGS

FIGS. 3a through 3f illustrate a sequence of steps employed in launching the aircraft shown in FIGS. 1 and 2.

FIG. 4 is an elevational view, on a somewhat enlarged scale, of the aircraft shown in the configuration illustrated in FIG. 3b, rotated 90° with respect to the plane of the drawing.

FIG. 5 is a front elevational view of the aircraft illustrated in FIG. 4.

FIG. 6 is a side elevational view, again on somewhat of an enlarged scale, of the aircraft in its configuration generally illustrated in FIG. 3c.

FIG. 7 is an elevational view depicting a typical airfoil for the aircraft.

FIG. 8 is a cross sectional view of a hydrazine engine employed for propelling the aircraft.

DESCRIPTION OF THE PREFERRED EMBODIMENT

Figure 1:
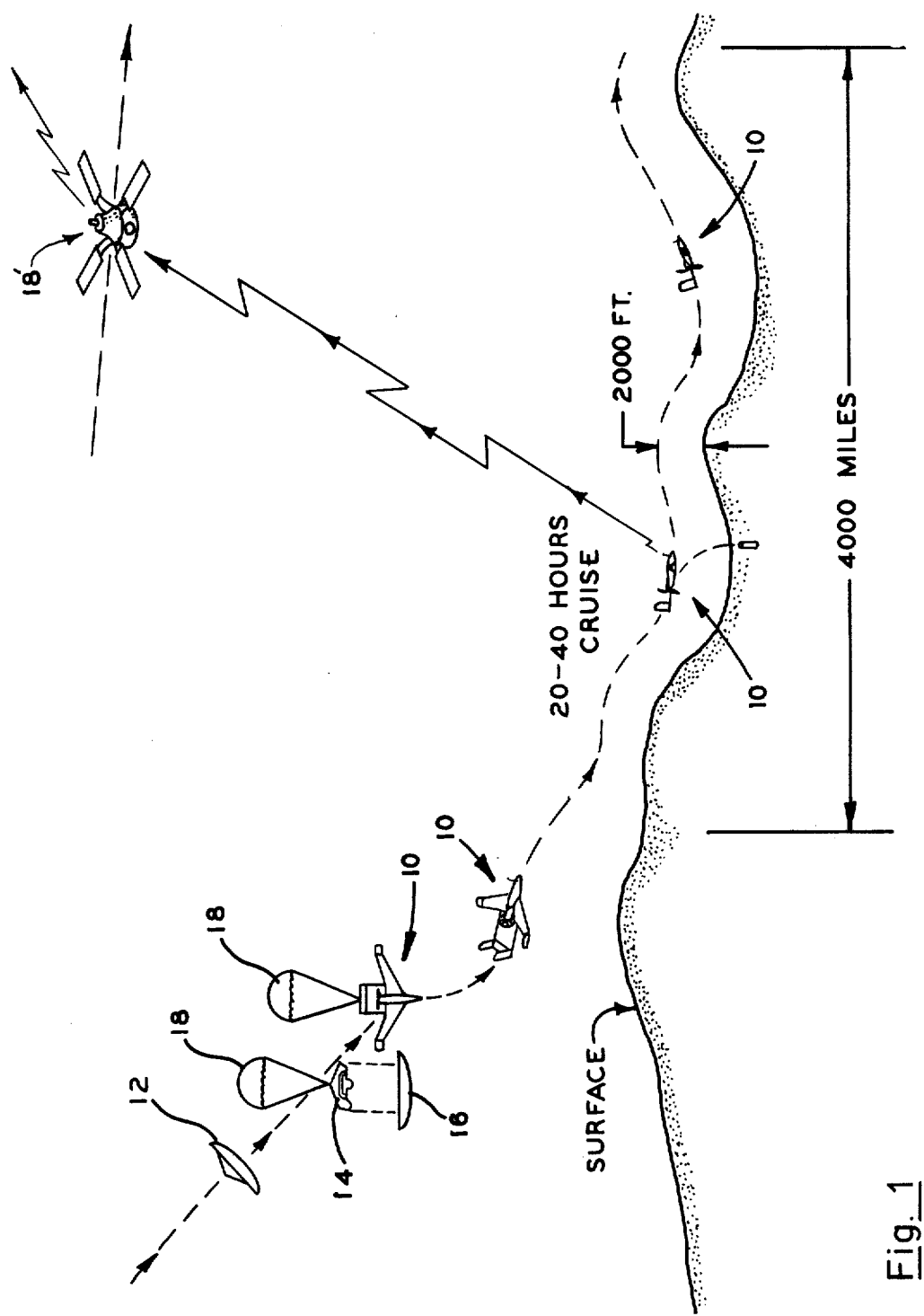
FIG. 1 is a pictorial view sequentially depicting a method wherein an aircraft is launched into the atmosphere above a selected land mass and piloted above its surface for acquiring information and transmitting data to an orbiting satellite for subsequent transmission to an ultimate station located on the earth's surface.

Referring now with more particularity to the drawings wherein like reference characters designate like or corresponding parts throughout the several views, there is pictorially depicted in FIG. 1 a sequence of steps employed in launching and piloting an aircraft, generally designated 10, employed in performing the method of the instant invention.

At the outset, it is to be understood that the method herein disclosed, generally speaking, makes use of existing technology. Therefore, the details of the structure herein described as being employed in performing a method which embodies the principles of the instant invention, form no part of the claimed invention.

Referring again to FIG. 1, it is noted that the aircraft 10 initially is launched into the atmosphere above the surface of a land mass employing an aeroshell 12. The aeroshell 12 preferably includes one of a series of aeroshells adapted to be ejected from an orbiter in a predetermined sequence. The orbiter, in turn, is adapted to be launched from a probe, shuttle craft, or similar vehicle of known design.

Conventionally, aeroshells include a capsule 14 protected by an ejectable heat shield 16, FIG. 1. As shown in the drawings, the capsule 14 is of a design suitable for accepting and confining the aircraft 10 when stowed in its compact configuration, as best illustrated in FIGS. 3a and 3b. The heat shield 16 readily is ejected from the capsule 14 through the use of explosive bolts and the like which, in effect, simply jettison the heat shield at an appropriate time into the mission whereby the capsule 14 is separated therefrom.

As shown, a simple parachute 18 is attached to the capsule 14 for supporting the capsule subsequent to the ejection of the heat shield.

As indicated in FIG. 1, the aircraft 10 is, during its flight, in continuous communication with a satellite 18' which serves as a data relay station whereby data transmitted from the aircraft 10 is processed and transmitted for subsequent relay to the surface of the earth. A suitable system employing communication links of known design is employed for this purpose.

Turning for a moment to FIGS. 3a through 3f it can be seen that the aircraft 10 when launched is suspended from the parachute through shroud lines, not designated, attached to the aircraft 10 at a suitable location, preferably beneath the fuselage at a coupling generally designated 20, FIG. 6. As shown, the mass of the aircraft 10 is located forwardly of the coupling 20 so that the aircraft is suspended by the parachute in a nose-downwardly configuration.

As illustrated, the aircraft 10 is adapted to be folded into a compact configuration for storage within the aeroshell 12. Consequently, it is necessary to accommodate erectional deployment of the aircraft subsequent to its ejection from the capsule 14. Therefore, the aircraft 10 is provided with suitable hinge and locking pins located within the wings of the aircraft sufficient to accommodate a folding and unfolding of the wings. As should be readily apparent to those familiar with the design and operation of aircraft conventional of design, various techniques may be relied upon in configuring the hinges. For example, it is well known that aircraft wings can be folded for stowage and subsequently deployed through the use of slave cylinders acting about hinge pins included in the wings of the aircraft. Therefore, a detailed description of suitable hinges and actuators incorporated in the aircraft 10 is believed to be well within the purview of the art and a detailed description thereof is omitted in the interest of brevity.

It suffices to appreciate that the aircraft 10 includes a fuselage 22 to which is attached collapsible wings 24 and axially extensible twin booms 26 provided for supporting aft control surfaces 28. Moreover, where desired, the twin booms 26 are of axially extensible telescopic design which further facilitates a collapsing of the aircraft into a compact configuration particularly suited to be received by the capsule 14.

While the design of the airfoil is varied as desired, the airfoil section illustrated in FIG. 7 has reasonable performance down to wing-tip Reynolds numbers of 200,000 at altitude. The thickness thereof is sufficient to afford adequate wing spar strength. As illustrated by the dotted lines of FIG. 7, which represent the configuration of an airfoil for the well known Gossamer Condor, the profile of the wing indicates that the wing passes zero-lift pitching moments.

The aircraft 10 is powered by a hydrazine engine, also of known design. As a practical matter, the hydrazine engine is similar in some respects to known $CO_2$ engines frequently employed for model aircraft. Of course, the conventional $CO_2$ aircraft engine uses a ball valve lifted by a finger on a piston and the $CO_2$ is provided from a cartridge.

Hydrazine, of course, can be stored for years, produces instant power when pumped through a catalyst bed and decomposes in the absence of oxygen. Thus, hydrazine engines are particularly suited for use in powering the aircraft 10. The hydrazine engine 30 employed for powering the aircraft 10 includes a hot gas valve 32 having a flat seat. A finger, not shown, is provided on the valve instead of the piston so that the piston is, in effect, flat. This minimizes sliding at the seating area to reduce spalling and cut tooling requirements. The entire valve operates at the temperature of the working fluid.

A gas generator 34 is mounted off the engine and connected thereto by small tubes, not designated, while a tube is used to direct hot gas into a small insulated plenum chamber 36 adapted to store enough hot gas to supply the cylinder without a serious drop in pressure. The gas generator 34, in practice, comprises a catalyst bed which serves to convert liquid fuel to hot gas at 1700° F.

A fuel tank 38, slightly pressurized by inert gas, is provided for feeding hydrazine into a fuel pump 40 which raises the pressure of the fuel about 850 psi. The hydrazine is then fed through a relief valve, not designated, which feeds the hydrazine to the gas generator 34. When the piston opens the hot gas valve, the hot gas is delivered to the piston for establishing the power stroke.

It is noted that the hydrazine engine, herein briefly described, is of known design and, therefore, the details thereof form no part of the claimed invention.

Connected to the drive shaft is a two-bladed propeller constructed of foam covered with Kevlar fabric. In practice, the propeller is employed as a pusher in order to enhance the observation capabilities of the cameras, sensors, protectors and the like comprising the payload for the aircraft, preferably located in a pod 44 located forward of the center of mass for the aircraft 10.

In performances of the method herein disclosed, an aeroshell 12 containing a capsule confining therein an aircraft 10 is projected into the rarefied atmosphere above a land mass. A suitable power source, such as rocket motors or the like, are employed at a predetermined altitude above the surface of the land mass for separating the aeroshell 12 from the heat shield 16 for thus permitting the heat shield to descend to the surface. However, a parachute 18 is deployed from the capsule 14 for purposes of supporting the aircraft 10 in a suspended relationship therewith. Upon being suspended from the shroud lines the aircraft 10 seeks a nose-down attitude, due to the fact that the center of mass thereof is located forwardly of the point at which the shroud lines of the parachute 18 are connected to the fuselage 22 of the aircraft 10. As the aircraft descends, mechanisms are activated for purposes of initiating a deployment of the wings 24, the twin booms 26 and the aft control surfaces 28. Once the wings, booms and control surfaces are deployed, the engine 30 is activated, whereupon the aircraft 10 is disassociated from the parachute 18, employing a suitable releasing mechanism, such as an explosively activated pin. As a practical matter, the propeller 42 may be employed for releasing the parachute. The aircraft 10 now drops away from the parachute and attains flying speed above the surface of the land mass. As a practical matter, the aircraft 10 may employ conventional terrain clearance circuitry for assuring that a suitable altitude, such as 2,000 feet, is maintained throughout its flight.

Figure 2:
FIG. 2 is a pictorial view depicting a typical flight path for the aircraft launched and piloted as illustrated in FIG. 1.

As the aircraft 10 progresses above the surface of the land mass, through canyons and the like, as depicted in FIG. 2, sensors, cameras, detectors and the like mounted in the pod 44 are activated for observing the characteristics of the surface being examined. Intelligence concerning the observed characteristics is then transmitted in the form of electronic data to an orbiting satellite 18'. While the data thus collected may be transmitted in real time, where desired, the data also may be stored aboard the aircraft for transmission at an optimum location relative to the surface and/or the satellite 18'. Finally, of course, the data may be stored aboard the satellite for subsequent transmission.

In any event, it should be appreciated that the aircraft 10 is intended to be operated over extended ranges for relatively long periods and studies have indicated that where the cruise range is cut in half, for certain atmospheres, numerous vertical takeoffs and landings may be performed for accommodating capture and delivery of surface objects.

In view of the foregoing, it should readily be apparent that the instant invention provides for a practical surveillance of the surface of a land mass for facilitating close-range observation of surface characteristics.

What is claimed is:

1. A method for achieving surveillance of the surface of a celestial body having a rarefied atmosphere comprising the steps of:

A. deploying from a parachute into the atmosphere a propeller-driven aircraft;
   B. piloting the aircraft in a horizontal cruise mode above the surface of the body, whereby the aircraft is caused to fly over portions of the surface to be monitored; and
   C. monitoring the portions of the surface during the flight of the aricraft thereover.

2. In a method for observing features characterizing the surface of a land mass of a planet, the steps comprising:

A. launching into an atmosphere above the land mass an aircraft folded into a collapsed configuration and suspended from a parachute, said aircraft being equipped with a propulsion unit including a bladed propeller, a reciprocating mono-propellant engine for driving the propeller, and electronic observation devices;
   B. erecting the aircraft into an air-worthy configuration;
   C. piloting the aircraft through the atmosphere and electronically observing the features characterizing the land mass; and
   D. transmitting to a station remotely related to the aircraft intelligence relating to the observed features.

3. The method of claim 2 wherein the step of launching an aircraft into the atmosphere includes the steps of projecting the aircraft into the atmosphere encased in a protective aeroshell and expelling the aircraft from the aeroshell.

4. The method of claim 3 wherein the aircraft comprises a collapsable aircraft stowed in the aeroshell in a collapsed configuration and adapted to be expanded upon an expulsion thereof from the aeroshell.

* * * * *